United States Patent [19]
Robinson

[11] Patent Number: 6,047,734
[45] Date of Patent: Apr. 11, 2000

[54] VALVE ASSEMBLY

[76] Inventor: Brian Anthony Robinson, 8 Tobermorey Place, Hawker Act 2614, Australia

[21] Appl. No.: 09/209,771

[22] Filed: Dec. 11, 1998

[30] Foreign Application Priority Data

Dec. 11, 1997 [AU] Australia .................... PP0854

[51] Int. Cl.$^7$ ...................................... F16K 3/00
[52] U.S. Cl. ........................ 137/625.37; 137/269
[58] Field of Search ................ 137/269, 625.28, 137/625.33, 625.37

[56] References Cited

U.S. PATENT DOCUMENTS

| 660,193 | 10/1900 | Loetzer | 137/269 |
|---|---|---|---|
| 1,511,302 | 10/1924 | Schnetzer | 137/625.37 |
| 4,941,507 | 7/1990 | Shenn | 137/625.37 |
| 5,236,014 | 8/1993 | Buls et al. | |

FOREIGN PATENT DOCUMENTS 0 471 643  2/1992  European Pat. Off. .

Primary Examiner—John Fox
Attorney, Agent, or Firm—Watson Cole Grindle Watson, P.L.L.C.

[57] ABSTRACT

A retrofit tap valve assembly is disclosed for a tap having a tap housing, an axial flow valve seat in the tap housing, a tap spindle adapted to effect sealing engagement between a tap seal and the valve seat, and a spindle housing mounted in the tap housing and mounting the tap spindle for axial movement relative thereto to effect the sealing engagement, the retrofit tap valve assembly including:

a longitudinally extending open-ended cylinder 15 member having a plurality of radially disposed apertures 17 extending longitudinally in the walls of the cylinder, the cylinder being adapted to sealingly engage the tap valve seat, and a piston member 16 adapted to be engaged by the tap spindle for axial movement therewith, the piston member including piston sealing means adapted to effect sealing engagement with the walls of the cylinder member.

8 Claims, 4 Drawing Sheets

VALVE ASSEMBLY

TECHNICAL FIELD

This invention relates to a valve assembly.

The invention has particular but not exclusive application to a domestic water tap and to a retrofit tap valve assembly for converting a domestic water tap from one having an axial flow path to one having a radial flow path.

BACKGROUND OF INVENTION

Domestic water taps usually have an axial flow path with a sealing washer which moves axially to engage or disengage a valve seat when the tap handle is turned. In such arrangements the valve seat and particularly the valve washer are subject to wear.

It is known for such domestic water taps to be retrofit with a valve assembly which converts the axial flow to flow through radially directed apertures with sealing effected by an O-ring. Australian patent application 39710/78 in the name of Martin illustrates a known arrangement.

SUMMARY OF INVENTION

The present invention aims to provide an alternative to known domestic water tap valve assemblies.

This invention in one aspect resides broadly in a retrofit tap valve assembly for converting a domestic water tap from one having an axial flow path to one having a radial flow path, the tap in the axial flow configuration having a tap housing with an inlet chamber and an outlet chamber, an axial flow valve seat in the tap housing dividing the tap housing into the inlet and outlet chambers, a tap spindle adapted to effect sealing engagement between a tap seal and the valve seat, and a spindle housing mounted in the tap housing and mounting the tap spindle for axial movement relative thereto to effect the sealing engagement, the retrofit tap valve assembly including:

a longitudinally extending open-ended cylinder member having a plurality of flow apertures in the walls of the cylinder, the flow apertures being located circumferentially about and longitudinally along the cylinder, the cylinder being adapted in use to be positioned in the outlet chamber and to sealingly engage the tap valve seat, and a piston member adapted to be engaged by the tap spindle for axial movement therewith, the piston member including piston sealing means adapted to effect sealing engagement with the inner wall of the cylinder member, such that flow through the tap is in a radial flow path through the flow apertures and is variable in accordance with the extent of axial movement of the tap spindle.

As used herein the expression "cylinder member" is to be given a broad meaning in the generic sense of a piston and cylinder. Thus the cylinder member need not necessarily be cylindrical although this is the preferred embodiment.

It is preferred that the piston sealing means is an O-ring supported on the piston.

It is also preferred that the outer surface of the cylindrical member is stepped, the step in the stepped surface being adapted to sit in the tap valve seat. In a preferred embodiment the sealing engagement of the tap valve seat and the cylinder is indirect with a seal or washer being mounted on the step.

In a preferred embodiment the cylinder member has a bearing surface adapted to be engaged by the spindle housing when mounted in the tap housing whereby the cylinder member sealingly engages the tap valve seat. Suitably the bearing surface is the upper rim of the cylinder member.

In another aspect this invention resides broadly in a retrofit tap valve assembly for converting a domestic water tap from one having an axial flow path to one having a radial flow path, the tap in the axial flow configuration having a tap housing with an inlet chamber and an outlet chamber, an axial flow valve seat in the tap housing dividing the tap housing into the inlet and outlet chambers, a tap spindle adapted to effect sealing engagement between a tap seal and the valve seat, and a spindle housing mounted in the tap housing and mounting the tap spindle for axial movement relative thereto to effect the sealing engagement, the retrofit tap valve assembly including:

a longitudinally extending open-ended cylinder member having a plurality of longitudinally extending flow apertures in the walls of the cylinder, the cylinder being adapted in use to be positioned in the outlet chamber and to sealingly engage the tap valve seat, the cylinder having an inner wall sealingly engaged in use by piston sealing means supported on a piston member adapted to be engaged by the tap spindle for axial movement therewith, the cylinder member having a bearing surface adapted to be engaged by the spindle housing when mounted in the tap housing whereby the cylinder member sealingly engages the tap valve seat.

In a further aspect this invention resides broadly in a domestic water tap including:

a tap housing having an inlet chamber and an outlet chamber;

an axial flow tap valve seat in the tap housing dividing the housing into the inlet and outlet chambers;

a tap spindle;

a spindle housing mounted in the tap housing and mounting the tap spindle for axial movement relative thereto;

a longitudinally extending open-ended cylinder member having a plurality of longitudinally extending flow apertures in the walls of the cylinder, the cylinder being adapted in use to be positioned in the outlet chamber and to sealingly engage the tap valve seat, and a piston member adapted to be engaged by the tap spindle for axial movement therewith, the piston member including piston sealing means adapted to effect sealing engagement with the inner wall of the cylinder member.

In a further aspect this invention resides broadly in a retrofit tap valve assembly for a tap having a tap housing, an axial flow valve seat in the tap housing, a tap spindle adapted to effect sealing engagement between a tap seal and the valve seat, and a spindle housing mounted in the tap housing and mounting the tap spindle for axial movement relative thereto to effect the sealing engagement, the retrofit tap valve assembly including:

a longitudinally extending open-ended cylinder member having a plurality of radially disposed apertures extending longitudinally in the walls of the cylinder, the cylinder being adapted to sealingly engage the tap valve seat, and a piston member adapted to be engaged by the tap spindle for axial movement therewith, the piston member including piston sealing means adapted to effect sealing engagement with the walls of the cylinder member.

DESCRIPTION OF DRAWINGS

In order that this invention may be more easily understood and put into practical effect, reference will now be made to the accompanying drawings which illustrate a preferred embodiment of the invention, wherein.

DESCRIPTION OF PREFERRED EMBODIMENT OF INVENTION

Figure 1A:
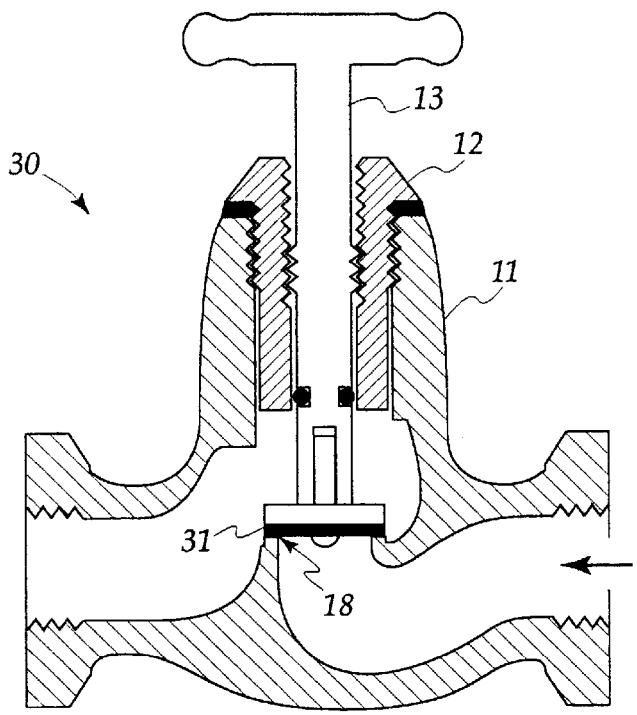
FIGS. 1A and 1B are cross-sectional elevations illustrating a domestic water tap having a known axial valve assembly shown respectively in the closed and open configurations.
Figure 1B:
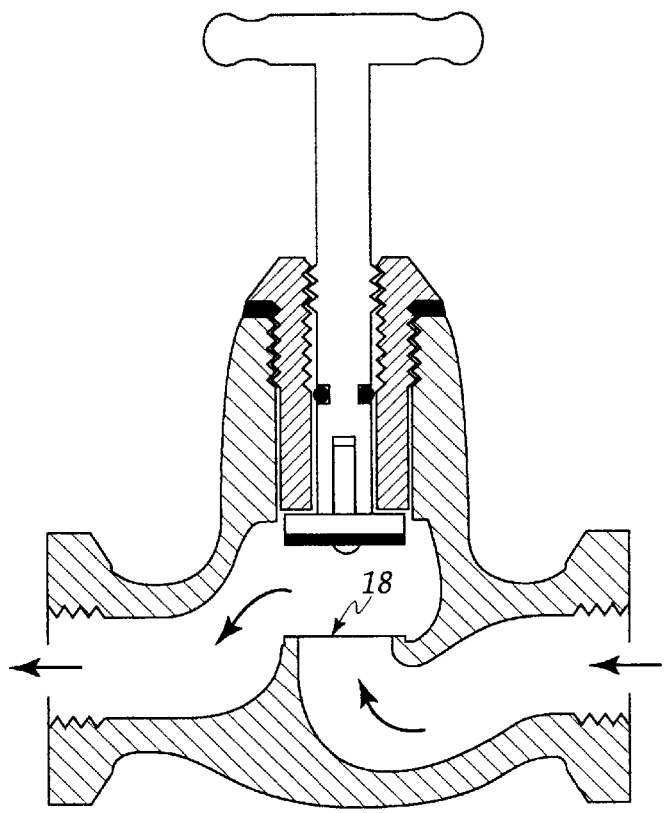

FIGS. 1A and 1B illustrate a conventional axial flow domestic water tap 30 having a tap housing 11, an axial flow valve seat 18 in the tap housing, a spindle housing 12 mounted in tap housing 11 and a tap spindle 13 mounted in housing 12. Rotation of spindle 13 effects sealing engagement between a tap seal 31 axially seated in the lower end of spindle 13 and valve seat 18 to thereby control the flow of water through the tap.

Figure 2A:
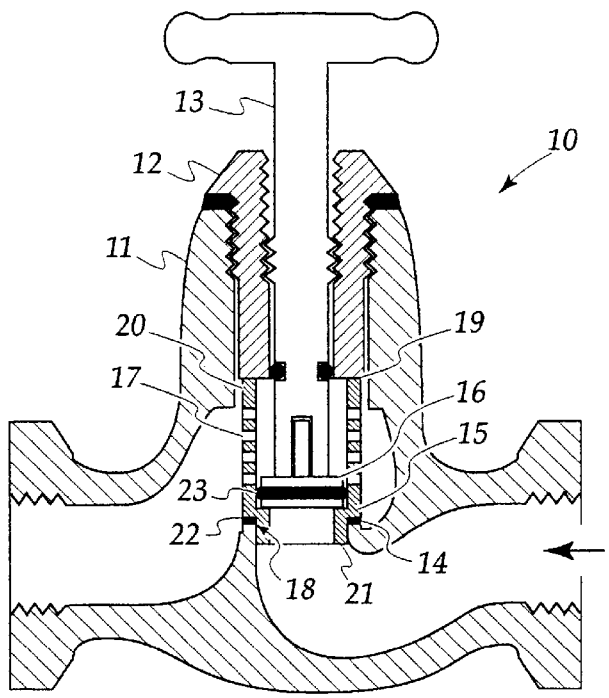
FIGS. 2A and 2B are cross-sectional elevations illustrating a domestic water tap having a radial valve assembly in accordance with the invention shown respectively in the closed and open configurations.
Figure 2B:
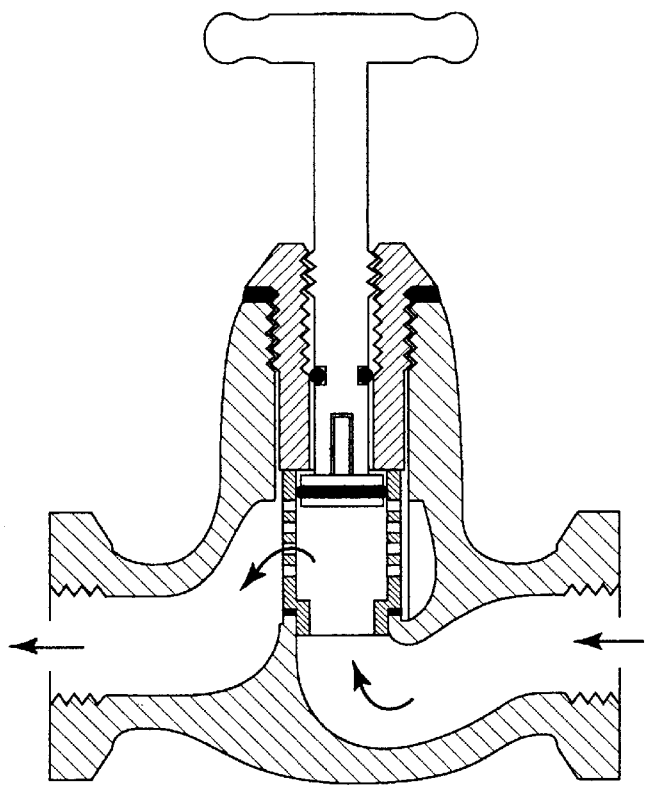
Figure 3:
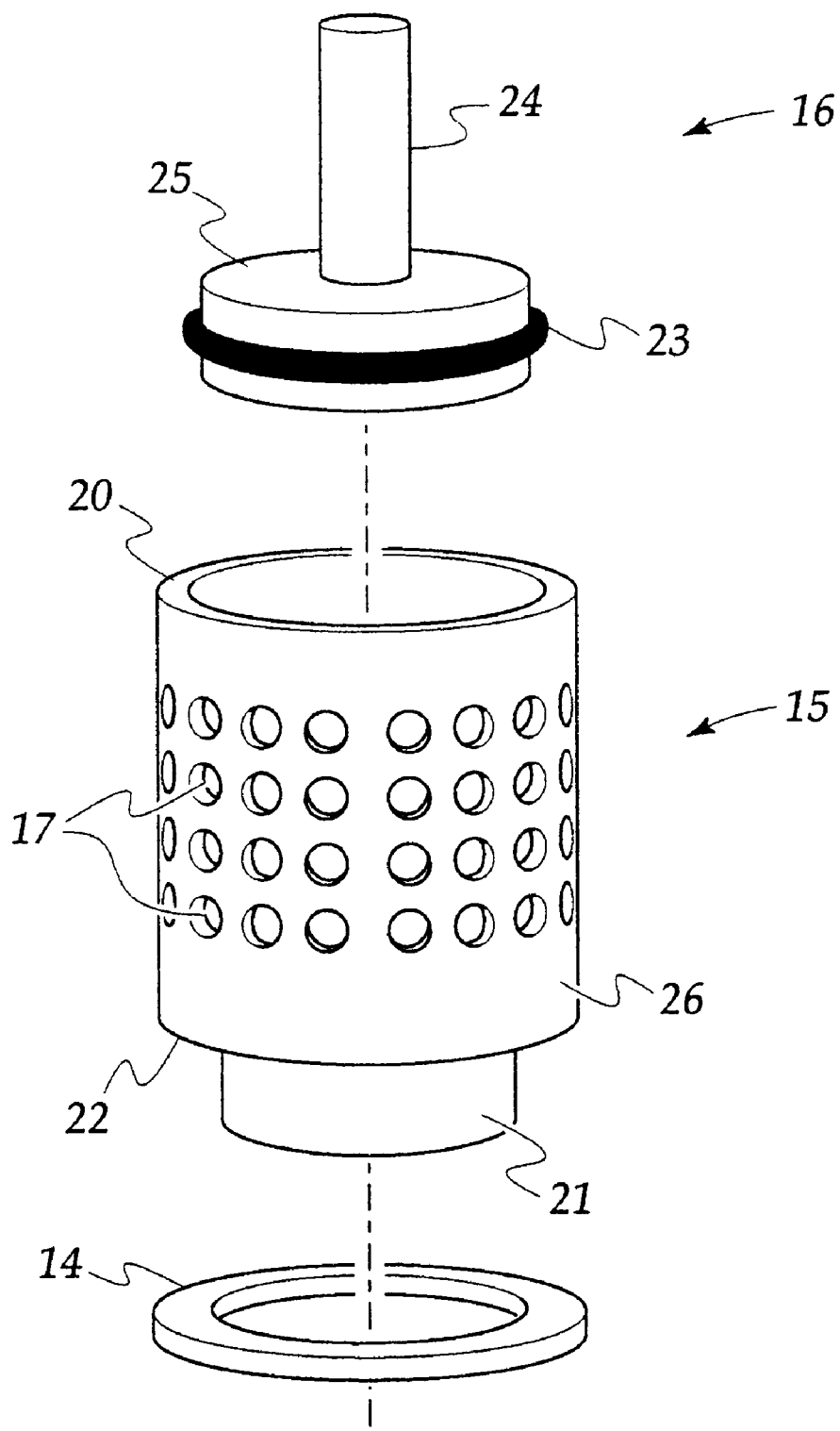
FIG. 3 is an exploded perspective view illustrating the retrofit domestic water tap valve assembly in accordance with the present invention.

The same reference numerals have been used in FIGS. 2A, 2B and 3 which illustrate the conversion of a conventional axial flow domestic water tap to a radial flow tap 10 by means of a radial flow retrofit tap valve assembly in accordance with the invention.

The radial flow retrofit tap valve assembly consists of longitudinally extending open-ended cylinder 15 and piston 16 received therein in sealing engagement therewith by means of O-ring 23 mounted in a groove on the piston head 25. Piston 16 is axially seated in the lower end of spindle 13 by means of shaft 24 in manner similar to conventional domestic water tap seal 31.

Cylinder 15 has a plurality of circular radially disposed apertures 17 extending longitudinally in the walls of cylinder 15 in a series of rows above a nonapertured lower cylindrical portion 26 against which surface O-ring 23 forms a seal in known manner under fluid pressure.

Cylinder 15 is stepped at 22 with lower stepped portion 21 fitting in valve seat 18. Step 22 carries a washer 14 which forms a seal with valve seat 18.

Figure 4:
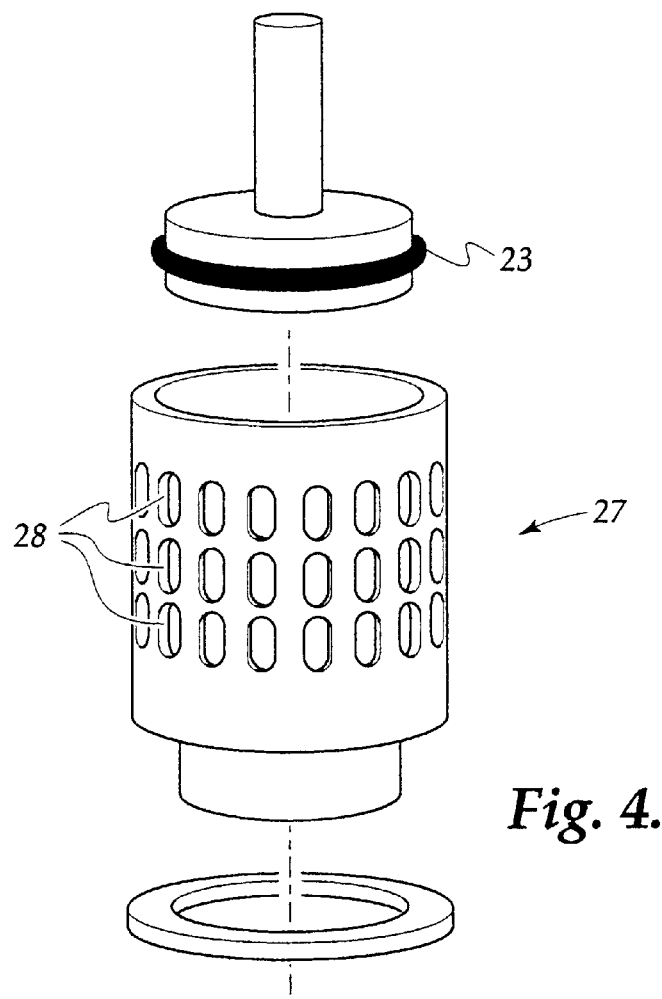
FIGS. 4 and 5 illustrate an alternative aperture arrangement to that illustrated in FIG. 3.
Figure 5:
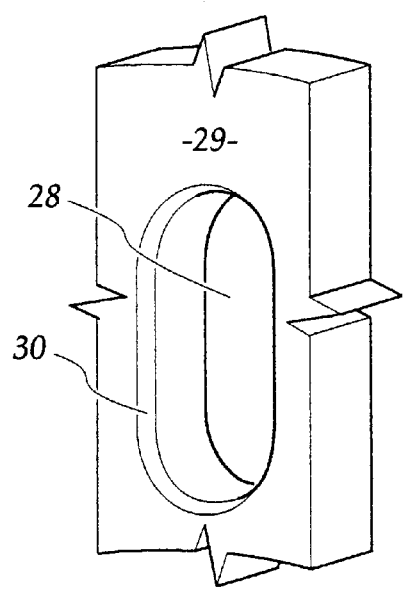

Alternatively as seen in FIGS. 4 and 5, apertures 28 in cylinder 27 may be elongate instead of circular. Furthermore the edge formed between aperture 27 and the inner surface 29 of cylinder 27 may be chamfered as seen at 30 to reduce wear on O-ring 23.

To convert a domestic water tap from axial to radial flow valve, spindle housing 12 is unscrewed from tap housing 11 and tap seal 31 removed from spindle 13 and replaced with piston 16. Cylinder 15 with washer 14 attached is then seated in valve seat 18 and spindle housing 12 screwed back into tap housing 11. This causes the lower end 19 of spindle housing 12 to bear on the upper rim 20 of cylinder 15 thereby forcing washer 14 into sealing engagement between step 22 and valve seat 18.

When tap 10 is operated, the longitudinally extending apertures 17 along cylinder 15 allow for flexible variation in the flow rate through the tap by progressively increasing the area of flow available as the spindle ascends when the tap is turned on.

The retrofit domestic water tap valve assembly in accordance with the present invention has a number of advantages in comparison with the prior art.

The apertured cylinder extends axially to sufficient extent to provide a bearing surface for the tap spindle housing which when tightened into the tap body housing effectively seals the cylinder step against the tap valve seat. This is a simple and effective alternative to the prior art approach of threading the tap valve seat and screwing in the apertured cylinder as it enables the retrofit assembly to be installed simply by the home handyman and thereby gain the benefits of a radial flow valve arrangement.

Furthermore, extending the apertures axially along the length of the cylinder provides for a greater flexibility in varying flow rates than in the prior art.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A retrofit tap valve assembly for converting a domestic water tap from one having an axial flow path to one having a radial flow path, the tap in the axial flow configuration having a tap housing with an inlet chamber and an outlet chamber, an axial flow valve seat in the tap housing dividing the tap housing into the inlet and outlet chambers, a tap spindle adapted to effect sealing engagement between a tap seal and the valve seat, and a spindle housing mounted in the tap housing and mounting the tap spindle for axial movement relative thereto to effect the sealing engagement, said retrofit tap valve assembly including:

a longitudinally extending open-ended cylinder member having a plurality of flow apertures in the walls of said cylinder, said flow apertures being located circumferentially about and longitudinally along said cylinder, said cylinder being adapted in use to be positioned in the outlet chamber and to sealingly engage the tap valve seat, and a piston member adapted to be engaged by the tap spindle for axial movement therewith, said piston member including piston sealing means adapted to effect sealing engagement with the inner wall of said cylinder member, such that flow through said tap is in a radial flow path through said flow apertures and is variable in accordance with the extent of axial movement of the tap spindle.

2. A retrofit tap valve assembly as claimed in claim 1, wherein said piston sealing means is an O-ring.

3. A retrofit tap valve assembly as claimed in claim 2, wherein the outer surface of said cylindrical member is stepped, the step in said stepped surface being adapted to sit in the tap valve seat.

4. A retrofit tap valve assembly as claimed in claim 1, wherein said cylinder member has a bearing surface adapted to be engaged by the spindle housing when mounted in the tap housing whereby said cylinder member sealingly engages the tap valve seat.

5. A retrofit tap valve assembly as claimed in claim 4, wherein said bearing surface is the upper rim of said cylinder member.

6. A retrofit tap valve assembly for converting a domestic water tap from one having an axial flow path to one having a radial flow path, the tap in the axial flow configuration having a tap housing with an inlet chamber and an outlet chamber, an axial flow valve seat in the tap housing dividing the tap housing into the inlet and outlet chambers, a tap spindle adapted to effect sealing engagement between a tap seal and the valve seat, and a spindle housing mounted in the tap housing and mounting the tap spindle for axial movement relative thereto to effect the sealing engagement, said retrofit tap valve assembly including:

a longitudinally extending open-ended cylinder member having a plurality of longitudinally extending flow apertures in the walls of said cylinder, said cylinder being adapted in use to be positioned in the outlet chamber and to sealingly engage the tap valve seat, said cylinder having an inner wall sealingly engaged in use by piston sealing means supported on a piston member adapted to be engaged by the tap spindle for axial movement therewith, said cylinder member having a bearing surface adapted to be engaged by the spindle housing when mounted in the tap housing whereby the cylinder member sealingly engages the tap valve seat.

7. A domestic water tap including:

a tap housing having an inlet chamber and an outlet chamber;

an axial flow tap valve seat in the tap housing dividing the housing into the inlet and outlet chambers;

a tap spindle;

a spindle housing mounted in the tap housing and mounting the tap spindle for axial movement relative thereto;

a longitudinally extending open-ended cylinder member having a plurality of longitudinally extending flow apertures in the walls of said cylinder, said cylinder being adapted in use to be positioned in the outlet chamber and to sealingly engage the tap valve seat, and a piston member adapted to be engaged by the tap spindle for axial movement therewith, said piston member including piston sealing means adapted to effect sealing engagement with the inner wall of said cylinder member.

8. A retrofit tap valve assembly for a tap having a tap housing, an axial flow valve seat in the tap housing, a tap spindle adapted to effect sealing engagement between a tap seal and the valve seat, and a spindle housing mounted in the tap housing and mounting the tap spindle for axial movement relative thereto to effect the sealing engagement, said retrofit tap valve assembly including:

a longitudinally extending open-ended cylinder member having a plurality of radially disposed apertures extending longitudinally in the walls of said cylinder, said cylinder being adapted to sealingly engage the tap valve seat, and a piston member adapted to be engaged by the tap spindle for axial movement therewith, said piston member including piston sealing means adapted to effect sealing engagement with the walls of said cylinder member.

* * * * *